US012228253B2

(12) United States Patent
Mann et al.

(10) Patent No.: US 12,228,253 B2
(45) Date of Patent: *Feb. 18, 2025

(54) LIQUID METHANE STORAGE SYSTEM AND METHOD

(71) Applicant: BENNAMANN SERVICES LTD, Newquay (GB)

(72) Inventors: Christopher Mann, Cornwall (GB); Michael Bennett, Cornwall (GB)

(73) Assignee: BENNAMANN SERVICES LTD, Newquay (GB)

( * ) Notice: Subject to any disclaimer, the term of this patent is extended or adjusted under 35 U.S.C. 154(b) by 357 days.

This patent is subject to a terminal disclaimer.

(21) Appl. No.: 17/587,881

(22) Filed: Jan. 28, 2022

(65) Prior Publication Data

US 2022/0154886 A1 May 19, 2022

Related U.S. Application Data

(60) Continuation of application No. 15/896,973, filed on Feb. 14, 2018, now Pat. No. 11,268,654, which is a
(Continued)

(30) Foreign Application Priority Data

Dec. 20, 2011 (GB) ...................... 1121931

(51) Int. Cl.
*F17C 7/04* (2006.01)
*F17C 13/02* (2006.01)

(52) U.S. Cl.
CPC .............. *F17C 7/04* (2013.01); *F17C 13/025* (2013.01); *F17C 13/026* (2013.01);
(Continued)

(58) Field of Classification Search
CPC .................. F17C 13/025; F17C 13/026; F17C 2203/0391; F17C 2221/033;
(Continued)

(56) References Cited

U.S. PATENT DOCUMENTS 4,386,309 A * 5/1983 Peschka ................ H01M 10/44
62/239
5,958,756 A 9/1999 Reynell
(Continued)

FOREIGN PATENT DOCUMENTS

DE 19854581 A1 6/2000
WO WO-2011105712 A2 * 9/2011 ............. B63B 25/14

OTHER PUBLICATIONS

International Preliminary Report on Patentability, issued in corresponding International Application No. PCT/IB2012/002760, dated Jun. 24, 2014, 9 pages.
(Continued)

*Primary Examiner* — Michael L Hobbs
(74) *Attorney, Agent, or Firm* — Rothwell, Figg, Ernst & Manbeck, P.C.

(57) ABSTRACT

Systems and methods for controlling the temperature and pressure of a cryogenic liquid methane storage unit are provided. The disclosed systems and methods generate methane gas from a reservoir of liquid methane stored within the methane storage unit, vent the methane gas through one or more outlet valves connected to the methane storage unit, and generate electric power using the vented methane gas. The generated electric power can then be used to initiating a cooling cycle, which reduces the temperature of said reservoir of liquid methane and reduces the pressure in said methane storage unit. Micro anaerobic digesters and
(Continued)

methane storage units may be configured in a networked environment with a central controller that monitors remote units.

16 Claims, 13 Drawing Sheets

Related U.S. Application Data division of application No. 14/367,740, filed as application No. PCT/IB2012/002760 on Dec. 20, 2012, now Pat. No. 9,927,067.

(52) U.S. Cl.
CPC ............ *F17C 2203/0391* (2013.01); *F17C 2221/033* (2013.01); *F17C 2223/0161* (2013.01); *F17C 2223/033* (2013.01); *F17C 2227/0369* (2013.01); *F17C 2227/0397* (2013.01); *F17C 2250/0626* (2013.01); *F17C 2250/0631* (2013.01); *F17C 2260/037* (2013.01); *F17C 2265/033* (2013.01); *F17C 2265/04* (2013.01); *F17C 2265/07* (2013.01); *Y02E 50/30* (2013.01)

(58) Field of Classification Search
CPC ........ F17C 2223/0161; F17C 2223/033; F17C 2227/0369; F17C 2227/0397; F17C 2250/0626; F17C 2250/0631; F17C 2260/0037; F17C 2265/033; F17C 2265/04; F17C 2265/07; F17C 7/04
USPC ............................. 435/262; 62/47.1
See application file for complete search history.

(56) References Cited

U.S. PATENT DOCUMENTS

| | | | |
|---|---|---|---|
| 8,741,142 | B1 | 6/2014 | Cook |
| 9,927,067 | B2 * | 3/2018 | Mann .................... F17C 13/025 |
| 11,268,654 | B2 * | 3/2022 | Mann .................... F17C 13/026 |
| 2002/0079266 | A1 | 6/2002 | Ainsworth et al. |
| 2004/0068993 | A1 | 4/2004 | Irie et al. |
| 2005/0217281 | A1 | 10/2005 | Adler et al. |
| 2006/0010708 | A1 | 1/2006 | Carin et al. |
| 2007/0175226 | A1 | 8/2007 | Karlsson et al. |
| 2009/0176135 | A1 | 7/2009 | Saito et al. |
| 2010/0018248 | A1 | 1/2010 | Fieler et al. |
| 2010/0078512 | A1 | 4/2010 | Páll et al. |
| 2010/0264079 | A1 * | 10/2010 | Begin .................... C05F 17/00 |
| | | | 210/603 |
| 2010/0319424 | A1 | 12/2010 | Wietgrefe |
| 2011/0003357 | A1 | 1/2011 | Barclay et al. |
| 2012/0308989 | A1 * | 12/2012 | Barclay ................. C12M 43/08 |
| | | | 435/167 |
| 2012/0317996 | A1 * | 12/2012 | Lee ........................ B63B 35/44 |
| | | | 62/53.2 |
| 2014/0116062 | A1 | 5/2014 | Hartono |

OTHER PUBLICATIONS

European Communication dated Aug. 17, 2017, issued in European Patent Application No. 12832707.9, 7 pages.

* cited by examiner

LIQUID METHANE STORAGE SYSTEM AND METHOD

CROSS REFERENCE TO RELATED APPLICATIONS

This application is a Continuation of U.S. application Ser. No. 15/896,973, filed on Feb. 14, 2018, now U.S. Pat. No. 11,268,654, which is a Divisional of U.S. application Ser. No. 14/367,740, filed on Jun. 20, 2014, now U.S. Pat. No. 9,927,067, which is a national stage entry of International Application No. PCT/IB2012/002760, filed on Dec. 20, 2012, which claims priority and the benefit of Great Britain Application No. 1121931.8 filed on Dec. 20, 2011, the entire contents of which are incorporated herein by references.

TECHNICAL FIELD

Aspects of this disclosure relate generally to green energy production and storage techniques, and more particularly, to systems and methods for anaerobic digestion and the storage of liquid methane.

BACKGROUND

Anaerobic digestion (AD) is a technique for converting organic matter into biogas, and ultimately, methane gas. Methane is the primary component of natural gas, which provides an increasing percentage of centralized power generation. Certain products utilizing anaerobic digestion have been deployed in attempts to reduce greenhouse gas emissions. These products have been mainly directed towards treating unwanted by-products, such as animal excrement or slurry as well as industrial and domestic food waste. However, the present disclosure recognizes that green garden waste, such as grass and weeds, also represents a valuable source of high energy content organic matter.

Accordingly, there is a need for systems and methods for the anaerobic digestion of green garden waste and storage of the resultant methane.

SUMMARY

According to some embodiments, a system for storing liquid methane is provided. The system includes a central hub and multiple micro anaerobic digestion units connected to the hub. Each of the micro anaerobic digestion units are configured to produce gaseous methane according to an anaerobic digestion process, vent the gaseous methane from a methane storage unit, and generate power using the vented gaseous methane. The power may be generated, for instance, using an internal combustion engine or fuel cell. The system can also include a controller that is configured to monitor one or more of PH, temperature, gas production rate, and gas pressure of the micro anaerobic digestion units. According to certain aspects, the controller is configured to manage the anaerobic digestion and methane storage process. For example, the controller can transmit signals to a transceiver associated with one or more micro anaerobic digestion units to, for example, open or close one or more valves of a micro anaerobic digestion unit. In some aspects, the controller can transmit a command to cause one or more micro anaerobic digestion units to generate power on an on-demand basis that can then be provided to an electricity grid.

According to some embodiments, a method for controlling the temperature and pressure of a cryogenic liquid methane storage unit is provided. The method includes generating methane gas from a reservoir of liquid methane stored within the methane storage unit, venting the methane gas through one or more outlet valves connected to the methane storage unit, and generating electric power using the vented methane gas. The generated electric power can then be used to initiate a cooling cycle, which reduces the temperature of the reservoir of liquid methane and reduces the pressure in the methane storage unit. Accordingly, a self-limiting and safe method for storing liquid methane can be implemented. The generation of the methane gas can be initiated based on the receipt of a control signal, for instance, from a central control unit.

According to particular embodiments, a cryogenic liquid methane storage device is provided. The device includes a methane storage unit with a methane input coupled to it. Liquid or gaseous methane is provided to the storage unit via the input, for instance, from an anaerobic digester. In certain embodiments, the anaerobic digester is particularly configured for green vegetative feedstock, such as grass clippings. The storage device also includes a cooling unit, which is located at least partially within the methane storage unit. The cooling unit may be, for instance, a refrigerator device or a compressor coupled to a heat exchanger. Additionally, the storage device includes a methane output that vents methane gas from the storage unit and a power generator coupled to the methane output. In certain aspects, the power generator is configured to operate using the methane gas vented from the storage unit and provide electrical power to the cooling unit. The cooling unit can then reduce the temperature and pressure of stored liquid methane.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
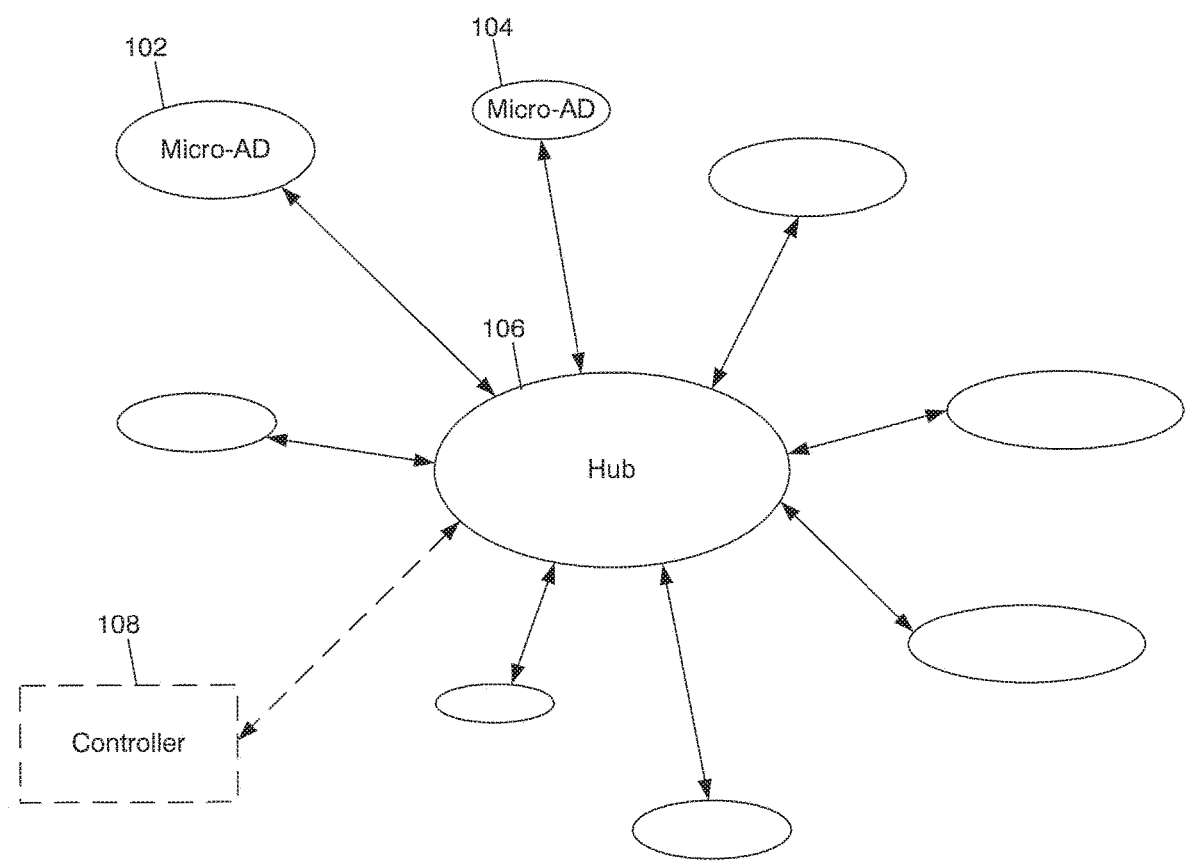
FIG. 1 is a diagram of an anaerobic digestion network in accordance with exemplary embodiments.

Until recently, natural gas has only been delivered directly from gas fields via pipeline. High fuel costs and a limited supply of fossil fuel based natural gas have made the bulk transportation of Liquid Natural Gas (LNG) from remote sites that would normally be considered too far from its final point of use to be economically viable, for instance, via gas pipeline, common place. Specially designed transport ships holding very large cryogenic flasks are also now being used.

However, the carbon dioxide ($CO_2$) produced when fossil fuel-based natural gas is burned still results in an overall increase in $CO_2$ emissions. By comparison, biogas is carbon neutral when combusted, and negative when compared to waste disposed by landfill. Unmanaged waste, for instance contained in existing landfill sites, causes the emission of high levels of bio-methane, which is a powerful greenhouse gas. In fact, it is as much as 25 times more damaging than the $CO_2$ that would be produced if it had been put through an anaerobic and combustion process. In the latter instance, the $CO_2$ by-product is itself a valuable resource that can be used, for example, to enhance growth of vegetable produce in greenhouses.

Bio-methane represents the ideal fuel for replacing fossil fuels, especially when considering that existing internal combustion engines can be converted to use bio methane, and that they would actually run at a higher chemical energy to mechanical energy conversion efficiency ratio. In addition, there are significant areas of currently unmanaged and unexploited green waste, such as that found in gardens, set aside land, roadside verges and parks, for example. However, the present inability to store methane as a liquid at room temperature and at relatively low pressure is currently restricting the use of such green waste as a replacement fuel. This represents a significant limitation for many applications such as de-centralized and remote power generation, as well as automotive transport.

Unlike fuels such as butane and propane, methane cannot presently be compressed into a liquid at room temperature and pressure using existing techniques. Consequently, it can only be stored as a liquid at reduced temperature with its boiling point at 1 bar of 112K (−161 C). Although useful quantities can be stored as a pressurised gas, current container technology restricts this to approximately 200 bar and in volumes of less than 100 liters. At this pressure, methane holds only approximately 30% of the energy of gasoline, thereby greatly reducing available range and storage capacity. Scaling the pressurized cylinders' volume does not provide a solution, as the required cylinder wall thickness scales with pressure, resulting in excessive weight and cost.

For temperate climates, the lack of compact storage systems and methods is particularly problematic for the generation of bio-methane from green waste. In temperate climate locations, the majority of green waste is present in summer months; however, most energy usage occurs during the winter months. Thus, for anaerobic digestion, the energy production cycle is out of phase with the seasonal energy demand, limiting its applicability as a sustainable renewable energy source.

If methane can be stored as a liquid under low pressure (equating to an energy density of gas stored at approximately 600 bar), then the energy density in terms of volume would converge to that of current fossil fuels. In terms of energy density as a function of mass, it would exceed current fossil fuels by 30%, having dramatic implications across a number of fields, such as aviation applications. This disclosure provides a solution to this problem. Certain of the embodiments described herein provide an intelligent, safe, scalable, self-contained, standalone, cryogenic, liquid methane storage facility. According to some embodiments, a standalone cryogenic methane storage facility is provide whereby the system can be left unattended with negligible risk of catastrophic failure or release of methane to the environment.

Cryogenic liquid storage systems are presently used for inert gases such as argon, nitrogen and helium. They usually consist of a sealed, vacuum insulated, cryogenic Dewar that is fitted with a pressure release valve that allows the excess boil off to vent to the atmosphere. Typical boil-off rates for industrial self-pressurizing Dewars are 1% of liquid a day.

As the gas inside a Dewar slowly warms, the pressure increases and eventually a pressure release valve opens, venting a small quantity of gas. This reduces the pressure, thereby closing the pressure release valve and ending the venting cycle. The pressure then builds and the cycle is repeated. This self-pressurized mechanism works well for inert non-flammable gases in non-confined spaces. However, for methane, a self-pressurized release mechanism on its own does not provide a safe or environmentally responsible solution. While liquid bio-methane is not flammable, gaseous bio-methane is not only flammable in concentrations of 5-15%, but is also a powerful greenhouse gas and should not be released to the atmosphere arbitrarily.

A solution to the above-identified self-pressurization problem can include the use of a mechanically or electrically powered cooling unit, such as a close cycle refrigerator coldhead coupled to a storage Dewar's main reservoir. The energy required to liquefy methane is much less (approximately 10%) of the chemical energy stored within the methane itself. This excess energy provides a convenient means of controlling the temperature of the main reservoir by using a self-limiting pressure release mechanism to ensure that boil-off is prevented and or controlled, and direct methane release to the environment is eliminated. The elimination of direct methane release limits the possibility of catastrophic over pressurization and or explosion due to ignition of a methane/air mixture.

According to particular embodiments, as the reservoir of liquid methane slowly warms and the pressure in the storage tank increases due to gaseous methane boiling off, the excess chemical energy stored in the boiled-off methane gas can be used by converting it to electrical energy via a power generator. This power generator could be, for instance, an internal combustion (IC) engine electrical generator or fuel cell. The excess electricity generated can be used to power a cooling unit, which can include a close cycle refrigeration cold head, to provide sufficient cooling to the main liquid methane reservoir, thereby reducing the pressure and preventing the subsequent boil-off of methane gas. The gaseous output from the combustion engine or fuel cell can be released to the environment as carbon neutral $CO_2$ and $H_2O$, which provides no added risk or environmental issues.

Accordingly, a cycle that includes: (1) pressurization; (2) venting; (3) power generation; (4) cooling; and (5) depressurization is self-limiting. With intelligent control, for instance, via a microprocessor, the cycle can be used as the basis for long-term standalone storage capability of liquid methane. Catastrophic over pressurization of the main methane reservoir can be avoided without venting methane gas to the atmosphere. In addition, the storage period is dramatically increased as the excess chemical energy is used to self-cool the reservoir.

While certain embodiments are described using an internal combustion engine generator or fuel cell to produce a reservoir of electrical energy stored, for instance, in a battery, there are equivalent setups wherein an IC engine (or battery) instead powers a gas compressor which fills a pressurized gas reservoir, which in turn can be used to drive the cooling. For simplicity, the following description will primarily utilize electrically powered examples, but it should be noted that an equivalent gas driven or mechanically driven mode of operation is equally applicable.

In some embodiments, micro anaerobic digestion (micro-AD) units may be deployed at geographically remote locations and connected via network connections to a central hub and/or control station. These units may include, for example, one or more anaerobic digestion tanks and a cryogenic storage system. The units may be deployed, for instance, as illustrated in FIG. 1, which shows an exemplary networked micro-AD system 100. The system 100 includes a number of micro-AD units 102,104 which are connected to a central hub 106. In some embodiments, each of the micro-AD units is configured to produce gaseous methane and store it in liquid form according to one or more of the techniques disclosed herein. Each of the micro-AD units may, for example, be configured to generate power using vented methane gas, which is in turn used to cool the liquid methane of their respective storage tanks. The system 100 also includes a controller 108, which may be co-located with the hub 106 or at an independent, remote location.

Figure 2:
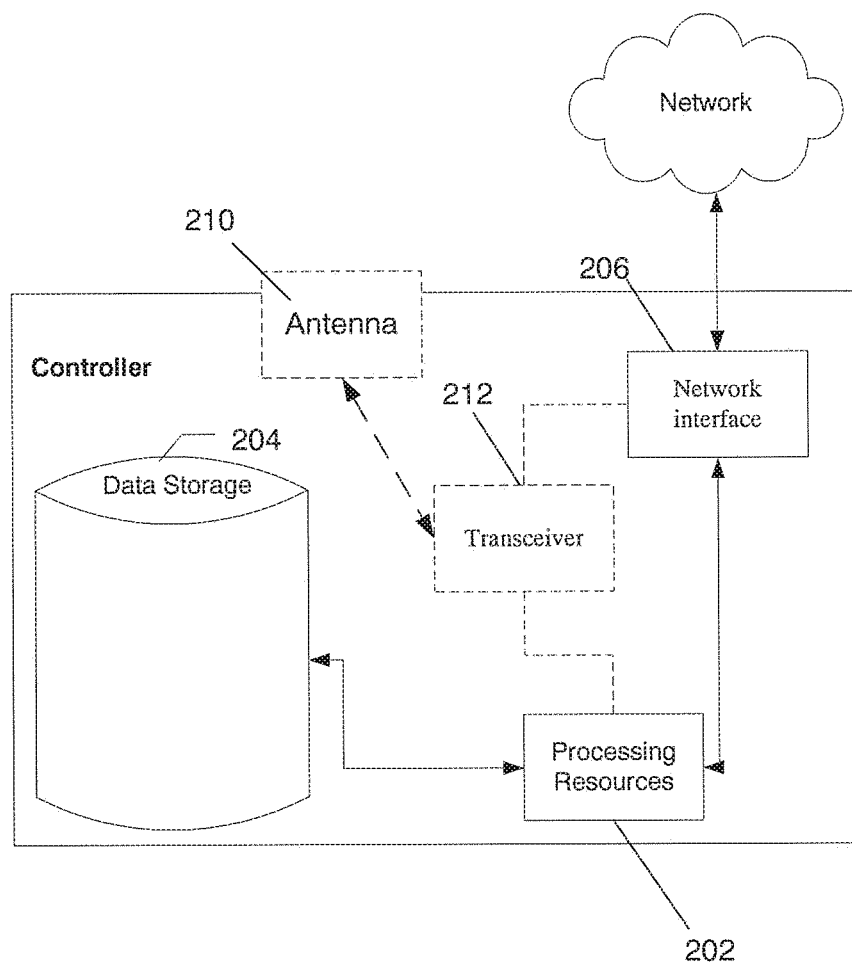
FIG. 2 is a block diagram of a controller in accordance with exemplary embodiments.

Referring now to FIG. 2, FIG. 2 illustrates a block diagram of a controller according to some embodiments. As shown in FIG. 2, the controller 108 may include: a data processing system 202, which may include one or more data processing devices each having one or more microprocessors and/or one or more circuits, such as an application specific integrated circuit (ASIC), Field-programmable gate arrays (FPGAs), etc; a data storage system 204, which may include one or more computer-readable mediums, such as non-volatile storage devices and/or volatile storage devices (e.g., random access memory (RAM)); and a network interface 206 for connecting controller 108 to a network (e.g., an Internet Protocol (IP) network). The controller 108 may communicate with one or more of the micro-AD units 102,014 or the central hub 106 via the network connection. In some embodiments, the controller 108 may include a transceiver 212 and antenna 210 to communicate wirelessly with one or more of the micro-AD units 102,104 or the central hub 106.

In embodiments where data processing system 202 includes a microprocessor, a computer program product is provided, which computer program product includes: computer readable program code (software), which implements a computer program, stored on a computer readable medium, such as, but not limited to, magnetic media (e.g., a hard disk), optical media (e.g., a DVD), memory devices (e.g., random access memory), etc. In some embodiments, computer readable program code is configured such that, when executed by data processing system 202, the code causes the controller to perform the steps described herein (e.g., one or more steps shown in the flowcharts and/or described in connection with FIG. 3). In other embodiments, controller 108 may be configured to perform steps described herein without the need for additional code. For example, data processing system 202 may consist merely of specialized hardware, such as one or more application-specific integrated circuits (ASICs). Hence, the features of the present disclosure described above may be implemented in hardware and/or software.

According to certain embodiments, the controller 108 can be configured to monitor aspects of the anaerobic digestion or storage/generation processes at the remote micro-AD units 102,104. For instance, the controller 108 may monitor one or more of PH, temperature, gas production rate, and gas pressure through the use of sensors located on the anaerobic digestion tanks and storage systems. These sensors may be, for example, electrical, mechanical, and/or chemical and may be accessed either directly or indirectly wirelessly or via network connection to the units. The controller 108 may send one or more control/activation signals to the micro-AD units to control certain aspects of the anaerobic digestion or methane storage process. For instance, the controller 108 may send a signal to open one or more valves. These valves may be used, for example, in the anaerobic digestion process or in the storage/generation process. Signals sent by the controller 108 and received by units 102,104 may operate one or more components of the unit directly, such as valves, or can cause a microprocessor located on the units to perform certain functions indicated by the signal.

Figure 3:
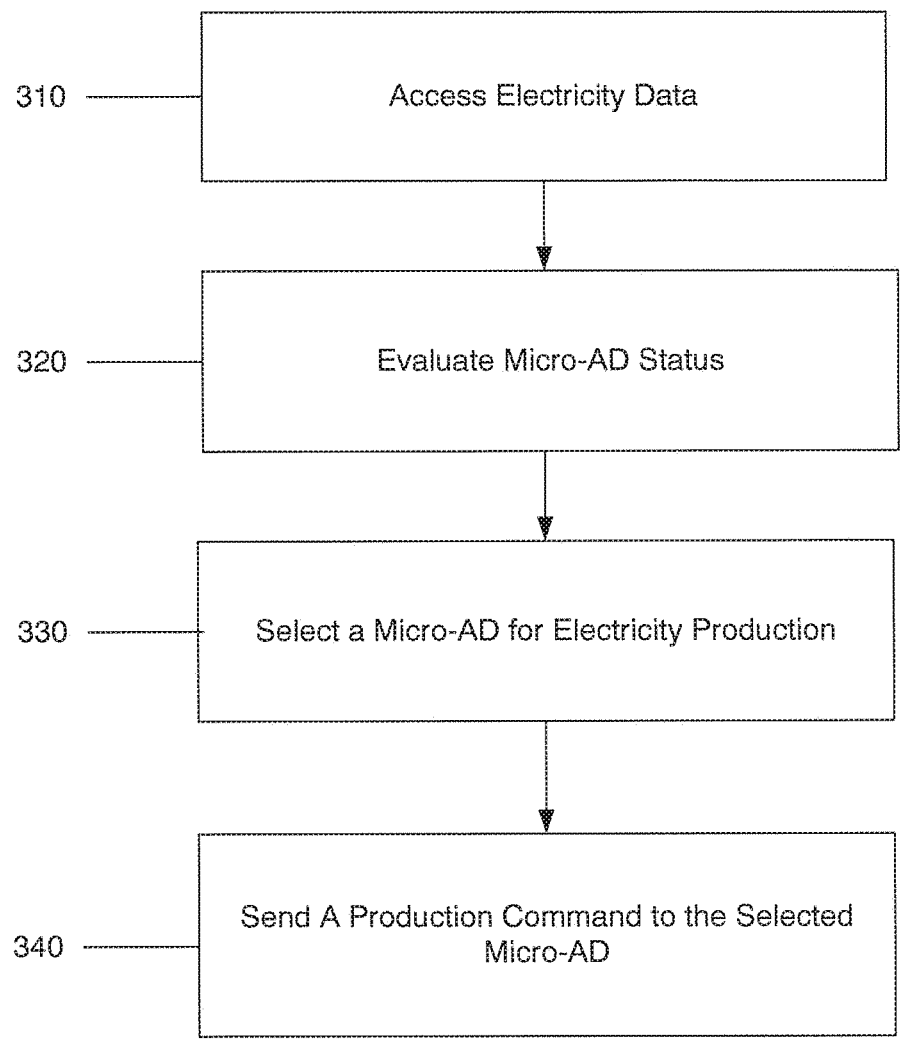
FIG. 3 is a flow chart illustrating a process for generating electricity in accordance with exemplary embodiments.

Referring to FIG. 3, a process 300 for generating electricity is provided. In some embodiments, controller 108 is configured to cause a micro-AD unit, such as unit 102, to produce electricity in accordance with process 300.

In step 310, the controller accesses electricity data, such as pricing data. For instance, controller 108 may access current electricity prices over the network. Additionally, electricity pricing data may be regularly downloaded onto data storage 204. In some embodiments, the data is evaluated to determine whether it is an optimal time to produce electricity. The data may indicate, for example, that there is a peak demand for electricity and/or that prices are higher than average.

In step 320, the controller evaluates the status of one or more micro-AD units to determine if it should be used for production. For instance, the controller 108 may evaluate micro-AD units 102,104 to determine whether one or both would be a suitable candidate for electrical power production. According to certain aspects, each of the micro-AD units 102,104 may be associated with a user. The status of a micro-AD unit may include, for example, historical usage data, historical production data, specifications of the unit, and user preferences regarding generation and storage volumes.

In step 330, based on its evaluation of the status one or more units, the controller 118 selects a unit for production. For example, the controller may select a micro-AD unit whose status indicates that it has a large production capacity, but is currently only using a small amount of that capacity. In some embodiments, the controller may not select a micro-AD having a low methane storage volume.

In step 340, the controller transmits a production command to the micro-AD unit. For instance, controller 108 can transmit a command to unit 102 that causes electrical power production. For instance, the controller 118 can transmit a signal to unit 102 instructing the unit to generate methane gas, power one or more electrical power generators located at the unit 102 with the generated methane gas, and provide the generated electrical power to an external power system, such as the mains electricity power grid.

In some embodiments, the controller may transmit a signal to the micro-AD to stop electrical power generation. In some embodiments, rather than using a stop command, the micro-AD 102 may be configured to produce electricity for a limited time, eliminating the need for stop command. In certain aspects, the amount of time or amount of energy produced may be set by the initial production command.

In some embodiments, the controller may receive a communication requesting electrical power production. For instance, the controller 108 may be in communication with one or more power companies and configured to receive on-demand power requests. Similarly, the micro-AD units may be in direct communication with one or more power companies, such that the power companies can directly initiate power production at one or more micro-AD locations.

According to certain aspects, the controller may include one or more databases, such as data storage 204, that stores information regarding the users associated with the micro-ADs. For instance, the database may include accounts records regarding the amount of electricity generated by a unit and/or delivered to the power grid. In some embodiments, following the production of the electricity, a controller, such as controller 108, updates a user's account to reflect the amount of electricity produced. In this manner, users can be accurately compensated for electricity production.

In some embodiments, electricity may be produced using methane that was created and stored several months in the past. For instance, methane gas may be created by the anaerobic digestion process during the warm summer months, cryogenically stored, and then used to produce power or heat during the colder winter months. In this manner, methane gas may be captured from a readily abundant source, such as fresh grass clippings, but used to create energy when there is peak demand, e.g., out of season from peak production. In certain aspects, due to the high efficiency of the disclosed systems, methane may be stored for several months or years before on-demand use.

Figure 4:
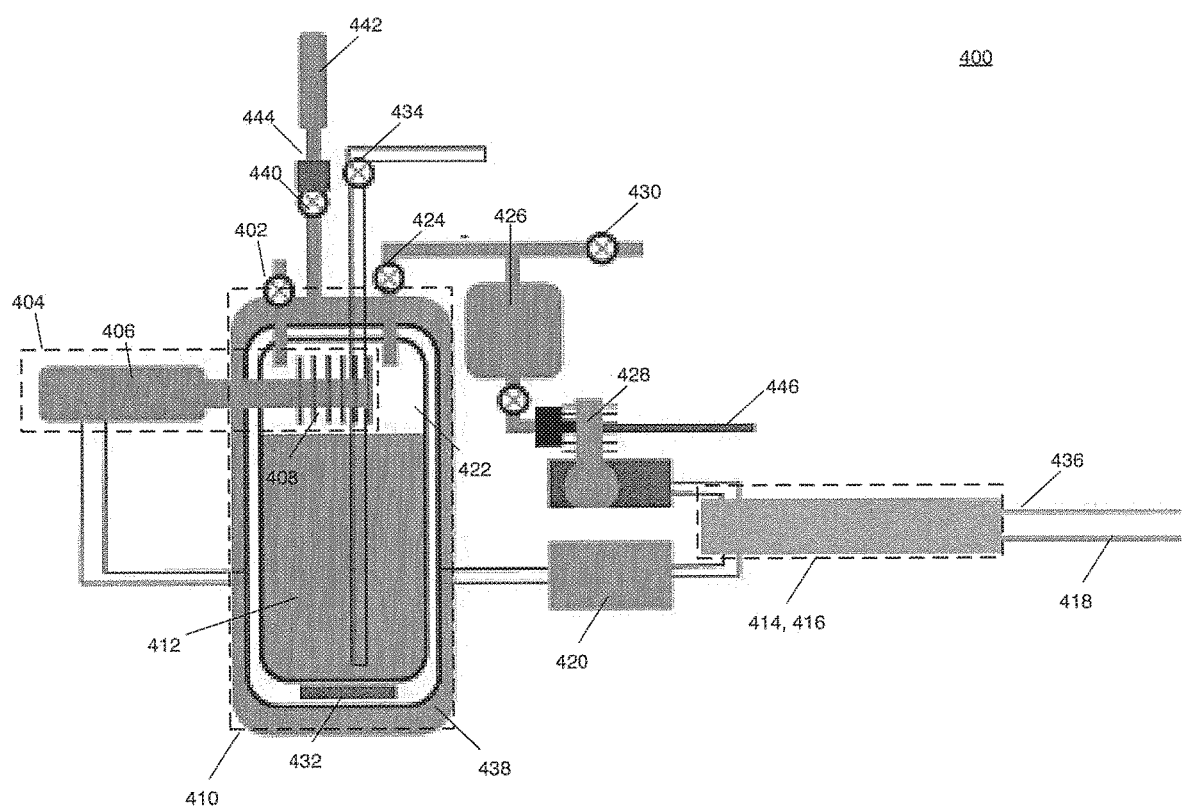
FIG. 4 is an illustration of a methane storage unit in accordance with exemplary embodiments.

Referring now to FIG. 4, FIG. 4 illustrates a block diagram of a storage portion 400 of micro-AD unit 102 according to some embodiments.

Micro-AD unit 102 includes at least one inlet valve 402. Methane gas or liquid methane gas may be introduced into storage vessel 410 via the inlet valve 402. The storage vessel 410 may be, for instance, a Dewar. A cooling unit 404 is configured to cool the methane gas or liquid methane gas within the storage vessel 410. The cooling unit may include, for instance, a closed cycle refrigerator 406 and closed cycle refrigeration head 408. In certain aspects, when the head 408 is cooled to a temperature below the condensing temperature of methane gas, liquid methane condenses on the head 408. In some embodiments, the head may be cooled to a temperature equal to or below 110 K. In certain instances, the head may be cooled to temperatures below 80 K; however, it is recognized that significant reduction in the temperature of head 408 increases the power consumption of the micro-AD unit 102. The condensed liquid methane will run off head 408 into the main liquid methane reservoir 412.

In some embodiments, mains electricity is available to the micro-AD unit 102. For instance, a mains power line 418 may be attached to a power supply/inverter 414, which is used to maintain a power storage device, such as battery 420, at a maximum charge level. In certain aspects, a microcontroller 416, which may include one or more processors, is also provided and attached to power line 418. One of skill in the art will recognize that the power supply/inverter 414 and microcontroller 416 may be provided as a single unit, or alternatively, as independent devices. The unit may also include one or more transceivers and antennas connected to microcontroller 416, for instance, to enable communication with external devices, such as a central controller, other micro-AD units, or user electronics.

One or more of the battery 420 and power supply/inverter 414 can be used to power cooling unit 404, for instance, providing power to closed cycle refrigerator 406 to manage boil-off of the liquid methane of reservoir 412. For example, the refrigerator 406 can be controlled to prevent any boil-off of the liquid methane of 412. According to this embodiment, the storage period of the liquid methane may be indefinite, as the unit can be configured such that there is no pressurization occurring within reservoir 412.

According to certain aspects, there may be an interruption of the mains electricity supply, in which case the battery 420 may be used to power the close cycle refrigerator 406 and head 408 head to manage (or even prevent) boil-off. It is recognized that if mains supply is unavailable for an extended period of time, the battery reserve will drop to its minimum charge level (according to type) at which point the battery 420 will stop powering the cooling unit 404. As the main reservoir of liquid methane starts to slowly warm, the pressure in reservoir 412 will start to build as boil-off of the liquid methane occurs and excess gaseous methane is present in the space above (422) the liquid methane.

The micro-AD unit 102 may include a pressure valve 424 to release boil-off methane. For instance, the valve 424 may be configured to release boil-off at a preset level into a buffer reservoir 426. The gaseous methane of the buffer reservoir may be used as fuel for one or more power generators of the micro-AD unit 102. For example, when the buffer reservoir reaches maximum capacity, or any pre-determined level, a power generator 428 may be started and powered by the gaseous methane of buffer reservoir 426. The power generator may be any source capable of providing sufficient electrical power to cooling unit 404, such as an internal combustion (IC) generator or fuel cell. In certain aspects, the IC engine output power may be sized such that sufficient electrical power is generated to allow full charging of battery 420 while simultaneously providing sufficient power to the closed cycle refrigerator 406. The generator 428 may include a $CO_2$ and/or $H_2O$ exhaust 446.

Aspects of some embodiments provide that once the buffer reservoir has been depleted of gaseous methane, the power generator 428 will stop. If the battery 420 is fully charged, then this charge can be used to continue to power to the close cycle refrigerator 406, for instance, to prevent boil-off. In certain aspects, if the battery 420 is not fully charged or if additional power is needed for one or more functions of the micro-AD unit 102, the closed cycle refrigerator 406 can switched off to allow the subsequent build-up and release of additional methane to fuel the power generator 428 and continue the charging process and/or additional process of the unit 102. Accordingly, methane gas is available "on demand" via controlled boil-off and release to the buffer reservoir 426. This cycle may be repeated until the battery 420 is fully charged, mains power is restored, and/or the reservoir of liquid methane is exhausted. One of ordinary skill will recognize that micro-AD 102 can be fully self-sustainable without mains electricity.

In some embodiments, if the battery 420 is fully charged, but conditions require the generator 428 to continue to consume the methane boil-off, then excess power from the generator 428 can be used to power the closed cycle refrigeration head 408 to cool the main reservoir 412 to the minimum allowable temperature. This cooling can delay further boil-off and extend the hold period of the system, thereby avoiding any overcharging of the battery 420.

According to certain aspects, the storage systems of this disclosure may be used to supply a continuous flow of gas or energy to an industrial or domestic plant (such as home heating) or an automotive application. In this instance, it may be necessary that micro-AD unit 102 is configured for the extraction of methane gas "on-demand." This extraction may be through a main output valve 430. Further, an internal heater 432, such as a resistive heater, of the main reservoir 412 can be used to intentionally increase boil-off and increase Dewar pressure for release of either methane gas or liquid methane. Liquid methane can be released through a liquid methane take-off port 434. Alternatively this heat could be supplied by reversing the closed cycle refrigerator 406 polarity such that it draws heat from the outside of the Dewar and transfers it to the main reservoir.

In addition to the natural self-limiting cycle described above, additional safeguards may be incorporated into the system. For instance, internet connectivity 436 can be incorporated to allow the microcontroller 416 to send a status update or alarm to the unit owner or supplier. This also allows for remote control or inspection of the system to be carried out by the owner or supplier. Additionally, while the main Dewar can utilize a vacuum for maximum insulating properties and minimal boil-off, an outer layer of solid insulation 438, such as low density polystyrene or other insulating material, can be incorporated to limit the excess boil-off resulting from a sudden loss of vacuum. The generator 428 can be rated to readily accept all boil-off resulting from such a scenario with all energy diverted to the coldhead 408 or resistive ballast in the microcontroller 416 as appropriate.

In some embodiments, the micro-AD unit may be provided with additional safeguard such as a high pressure release valve 440. Such a safeguard may be used, for instance, following a failure of the closed cycle refrigerator 406 and simultaneous failure of the generator 428. The boil-off may flow to a flame containment vessel 442, such as a metal gauze cavity. The pressure release valve 440 can be configured to trigger a mechanical igniter 444 to ignite the resulting boil-off converting the methane to $CO_2$ and $H_2O$ in a controlled flare.

Figure 5:
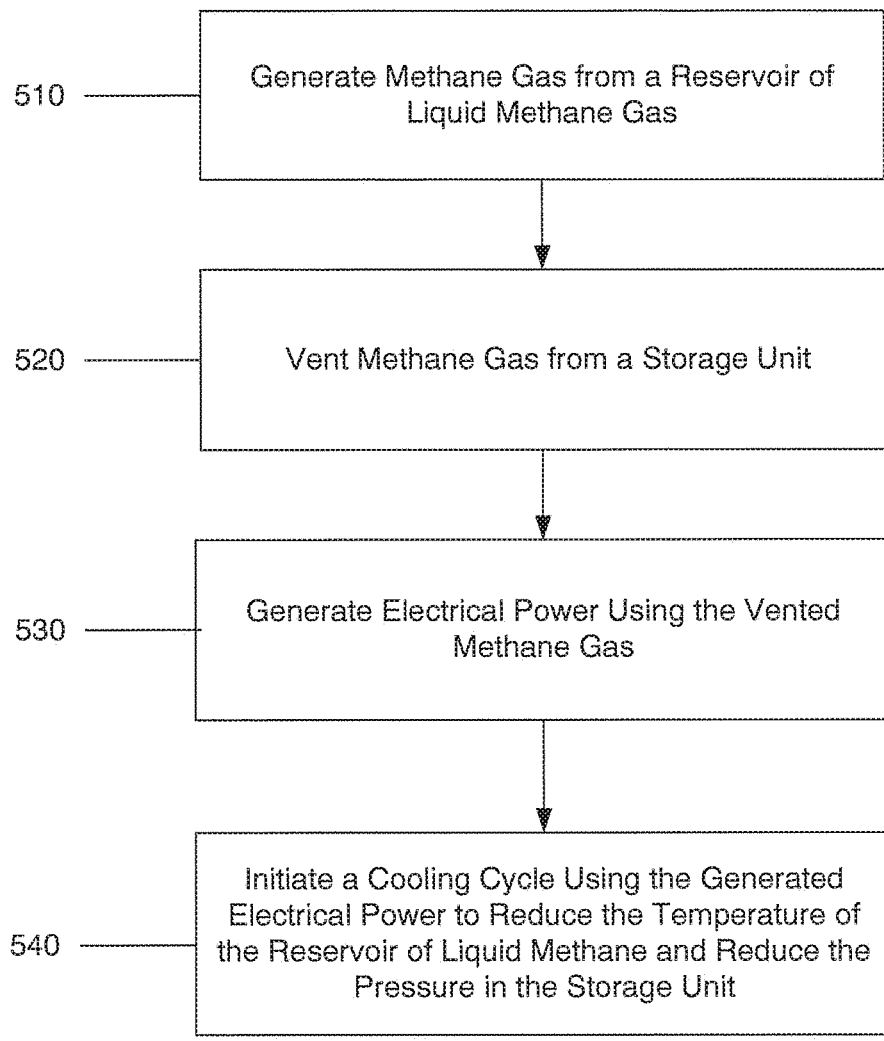
FIG. 5 is a flow chart illustrating a process for storing liquid methane in accordance with exemplary embodiments.

Referring now to FIG. 5, a flow 500 illustrating a process for storing liquid methane is provided.

In step 510, methane gas is generated from a reservoir of liquid methane gas. The reservoir of liquid methane may be, for instance, the product of compressing biogas formed from anaerobic digestion. In some embodiments, the methane gas may be generated by activating a heater, such as heater 432 of FIG. 4, to cause boil-off of methane gas from the liquid reservoir. Generating may also include, for example, turning off or reducing a cooling unit, such as unit 404 of FIG. 4, or allowing methane gas to be naturally generated due to boil off of a reservoir of liquid methane.

In step 520, the methane gas is vented. For instance, the methane gas may be vented from the storage unit containing the reservoir of liquid methane, such as storage unit 410 of FIG. 4. The gas may be vented through one or more valves and/or buffer stages to an electrical power generator.

In step 530, the electrical power generator generates electrical power using the vented methane gas. For instance, the power generator may be an internal combustion (IC) engine configured to run on methane gas. Alternatively, the power generator may be a fuel cell. One of ordinary skill in the art will recognize that the present disclosure is not limited to IC engines and fuel cells, but rather, the devices and methods herein can be implemented using any power generator configured to run, at least in part, on methane gas.

According to certain embodiments, the method 500 may include receiving an activation signal, for instance, from a user or central controller. The venting and/or power generation of steps 520 and 530 may be responsive to this activation signal. For example, the activation signal may cause one or more controllable valves to open, thereby venting methane gas and providing fuel to a power generator. The activation signal may be received directly at one or more control devices, or, at a microcontroller located with the methane storage unit configured control its operation.

Figure 6:
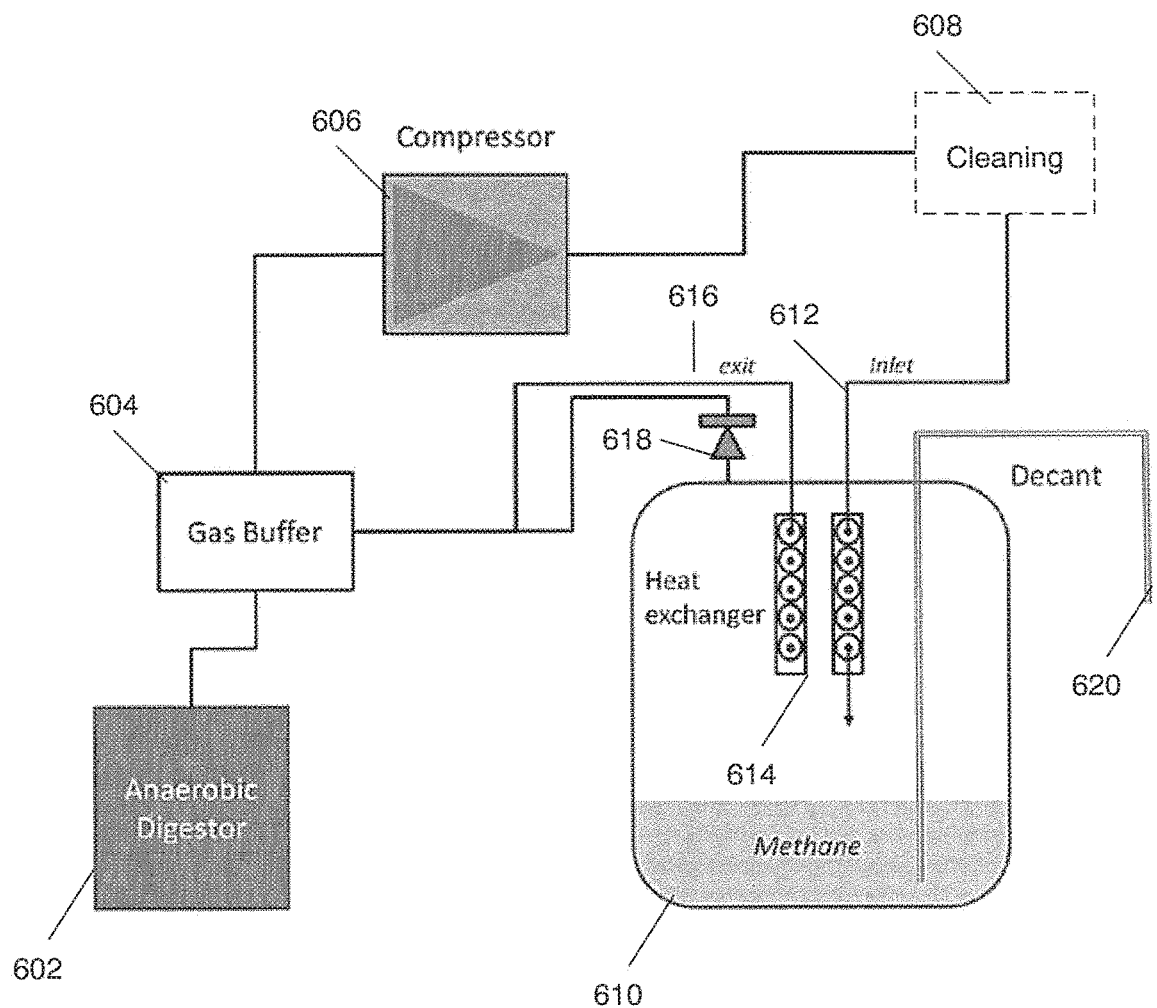
FIG. 6 is an illustration of a methane storage unit in accordance with exemplary embodiments.

In step 540, a cooling cycle is initiated. The cooling cycle may be initiated, for instance, by activating a cooling unit, such as unit 404 of the FIG. 4. In some embodiments, the cooling unit may include a close cycle refrigerator and a cold head within the methane storage unit. The cooling unit causes the temperature of the reservoir of liquid methane to drop, thereby reducing the pressure in the storage unit. In certain respects, the cooling is powered by the electrical power generated in step 530. The cooling may be powered directly by the power generator, or indirectly by the power generator through the use of a battery, such as battery 520 of FIG. 4. In some embodiments, the cooling cycle may be initiated by activating a compressor coupled to a heat exchanger, for instance, as illustrated in FIG. 6. For example, compressor 606 may be powered by the electrical power produced in step 530.

In some embodiments, process 500 may further include producing liquid or gaseous methane according to an anaerobic digestion process and transferring the methane to the storage unit. This anaerobic digestion process may use, for example, green vegetative feedstock such as grass clippings.

Referring now to system 600 of FIG. 6, in some embodiments, gas generated in an anaerobic digester 602 can be stored in a gas buffer 604. The gas may be stored in the buffer 604, for example, until a predetermined pressure is reached. A compressor 606 is started and the gas is circulated from the buffer through the compressor 606. The compressor 606 may be started, for example, once the predetermined pressure in buffer 604 is reached. The compressed gas may then be passed to an optional cleaning stage 608. The compressed gas is circulated to a storage tank 610 via inlet 612 that includes a heat exchanger 614. In some embodiments, heat exchanger 614 may include finned heat exchanger tubing. According to certain aspects, the gas may be expanded through an orifice of heat exchanger 614 for cooling, or alternatively, a variable needle valve. After expansion, liquefied methane collects in the storage tank 610, which may be, for example, a Dewar. The remaining gaseous methane, i.e., the non-liquefied methane, returns to gas buffer 604 via exit 616. The system 600 may also include one or more control valves 618 to regulate pressure and control gas flow. The liquid methane may be removed from storage tank 610 as needed, for instance, via a decanter 620.

According to some embodiments, anaerobic digestion may be performed using multiple tanks. Typically, anaerobic digestion requires the use of heat to initiate the process. Methanogens, which are microbes that digest feedstock such as grass, can be split into two categories based on the temperature ranges at which they function. These categories/ ranges are referred to as "thermophilic" (approximately 45-70 C) and "mesophilic" (approximately 15-40 C). The thermophilic anaerobes are typically considered more difficult to sustain in a continuous process, although possible. Thermophilic anaerobes, however, are able to digest grass at a much faster rate (approximately twice as fast as mesophilic anaerobes) and can be sustained in a continuous process. In certain aspects, systems disclosed herein may be designed to operate between these two modes. For instance, a first thermophilic process can be used to break down as much of the feedstock (e.g., grass) as possible, while the remaining organic matter is then passed onto one or more additional tanks to finish of the digestion using a mesophilic process.

Figure 7:
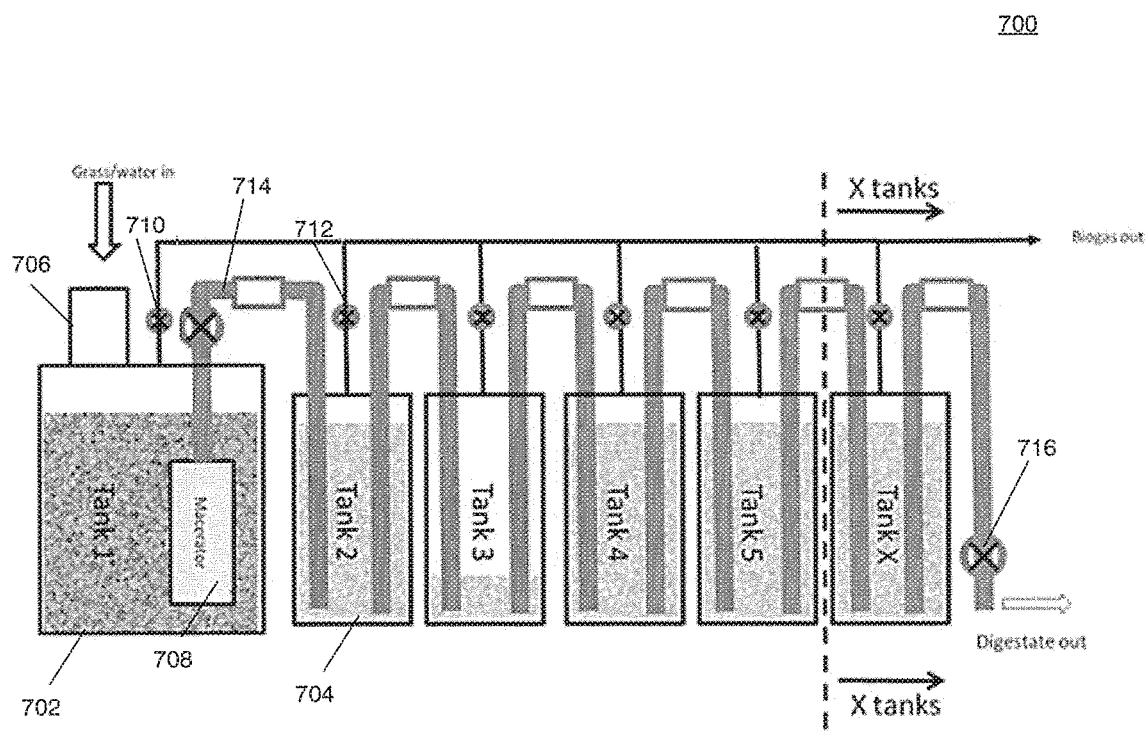
FIG. 7 is an illustration of an anaerobic digester in accordance with exemplary embodiments.

Referring now to FIG. 7, an anaerobic digester 700 according to certain embodiments is illustrated. In some embodiments, the anaerobic digester of FIG. 7 may be a part of micro-AD 102 and coupled to storage system 400. For instance, digester 700 can provide the input to system 400 at inlet 402. The anaerobic digester 700 consists of multiple tanks (702,704). The tanks may be relatively small, and the total number of tanks may be set according to a customers intended use and/or the amount of land that will be used to supply feedstock. In certain aspects, a PH gradient and temperature gradient can be maintained across the tanks. The digester 700 may further include an inlet 706 for receiving feedstock and a macerator 708 to mulch, agitate and/or separate components of the feedstock during anaerobic digestion.

In some embodiments, the gas output from each tank is controlled via a latching gas valve 710,712. In certain aspects, the valve may be remotely controllable, for instance, via local or remote computer. If a quantity of substrate (e.g., partially digested feedstock) is required to be moved from one tank to the next, for instance, from tank 702 to tank 704, the gas output of the sending tank 702 can be turned off using gas valve 710. However, the gas output valve 712 of the receiving tank 704 is left open. The gas pressure in the sending tank 702 is then allowed to build up and as a result the substrate is forced though the outlet pipe 714 and into the receiving tank 704. Once the substrate move has taken place, the gas pressure from the sending tank 702 is relieved to a point at which transfer stops. The gas pressure may then be maintained at this level to prevent re-syphoning of the substrate. In some embodiments, the pressure can be completely released to allow the levels of the tanks 702,704 to re-equalize.

In some embodiments, one tank of digester 700 is left intentionally empty. In certain embodiments, at least one tank is always left empty. This enables the complete movement of one tank load of substrate along the line of tanks. Accordingly, the entire state of a number of tanks can be moved one place to the left or right, leaving the state of the entire process intact. In this way, it is possible to introduce a completely new fill of feedstock, for instance, at the beginning of the stream. This movement of substrate can be achieved using the pressure generated by the anaerobes, for instance, as described above. If latching valves are used, the moving process uses a negligible amount of energy.

In some embodiments, the feedstock needs to pass through several different stages of digestion. For instance, it may pass from an initial aerobic hydrolysis/bacterial phase which breaks down insoluble polymers, such as carbohydrates, and makes them available for other bacteria. This phase also provides significant levels of heat which can be used to establish a rapid thermophilic phase, followed by a slower mesophilic phase used to digest the remaining material and produce the final digestate. The temperature of the substrate can be used to speed up or slow down the anaerobes digestion rate; however, if the PH moves outside a certain window, then the complete population can be killed, thereby halting the process entirely. According to certain aspects, the process is returned to an aerobic digestion state to compost any residual organic matter and remove any unpleasant odors before expelling the digestate, for instance, via an outlet valve 716.

According to some embodiments, pressure in the final tank or "stage" of a multi-tank/stage anaerobic digester, such as digester 700 of FIG. 7, can be allowed to build up to a desired pressure. Pressure build-up can be controlled, for example, by adjusting one or more valves of the digester and/or increasing temperature. In certain aspects, the desired pressure is high enough that a compressor in subsequent processing stages is not required. For instance, if the pressure is allowed to build to a high enough level, for example between 2 and 30 bar, it may be possible to eliminate compressors that would otherwise be needed during cleaning or liquification, such as compressor 808 of FIG. 8 or compressor 606 of FIG. 6. The specific pressure required, however, will depend on the configuration of one or more of the digester and subsequent stages. Referring to FIG. 6, in some embodiments, the pressure in a final stage of anaerobic digester 602 can be allowed to increase such that naturally pressurized biogas is fed to heat exchanger 614, which may include finned heat exchanger tubing. Similarly, with respect to the example of FIG. 8, naturally pressurized biogas may by passed through filter 816 onto heat exchanger 812, which may also include finned heat exchanger tubing. Accordingly, the cleaning and/or liquification process can be effectively powered by the anaerobic digestion process itself and the associated microbes.

According to certain embodiments, a micro-AD 102 can be designed to operate using primarily a single type of feedstock, such as grass cuttings. By restricting the feedstock to a single source, such as grass cuttings, the chemistry required to achieve a continuous anaerobic digestion and methane production process is greatly simplified. When using a micro-AD configured for a single source, a continuous multistage process that mimics a ruminants digestive process may be implemented, which maximizes throughput and methane production. This allows for the use of very small digester tanks, which therefore allows the entire system to be placed inside a small visually inert enclosure.

Grass cuttings offer certain advantages over other feedstocks, such as animal slurry or food waste. For instance, the energy content per unit volume can be much higher, as grass is able to process and store approximately 6% of the sunlight that falls onto it as chemical energy, held in the form of sugars and starches. With respect to animal slurry, a ruminant such as a cow, horse or lamb for example, has extracted much of the available energy to drive its metabolism, grow and store fat. Additionally, the energy stored in a grass leaf is more readily extracted, being largely in the form of sugars and starches rather than lignin, a chemically inert material that is difficult for most microorganisms to digest. This offers the potential to achieve much higher conversion rates from the raw feedstock into methane. Grass is also abundantly available and can be harvested from domestic lawns, parks, golf courses and roadside verges etc.

In some embodiments, the exclusive use of grass cuttings also assists in biogas purification. The biogas that results from anaerobic digestion of grass cuttings consists primarily of methane ($\approx$70%), carbon dioxide ($\approx$30%) and a trace amount of hydrogen sulphide. The hydrogen sulphide can be removed, for example, by passing the biogas through a filter, such as a steel powder filter. The removal of the hydrogen sulphide limits the release of unpleasant odors. Once the hydrogen sulphide has been removed, the remaining biogas can be used directly to fuel a combustion engine without causing long term damage to the combustion engine. According to some embodiments, the carbon dioxide is simply passed through the engine and released by the exhaust.

However, in certain embodiments, the carbon dioxide should be removed. For instance, if the biogas is to be stored for later use the carbon dioxide should be removed. As carbon dioxide is itself a potentially useful and valuable byproduct, the carbon dioxide may be separated and stored in its solid cryogenic form. This can be carried out as part of the methane storage process described above, for instance in FIG. 5, and in conjunction with the devices of FIGS. 4 and 7.

Figure 8:
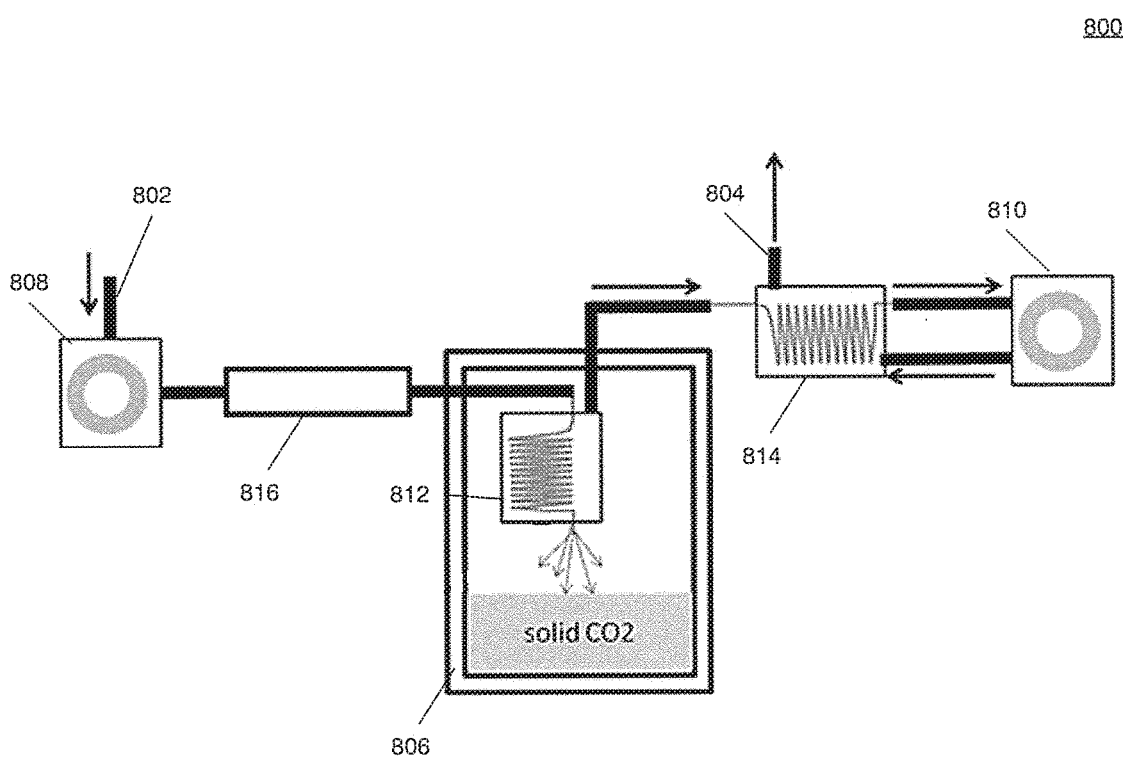
FIG. 8 is an illustration of a methane cleansing system in accordance with exemplary embodiments.

Referring to FIG. 8, an exemplary $CO_2$ removal stage 800 is provided. The removal stage 800 includes an inlet 802, and outlet 804, and a $CO_2$ storage unit 806. The stage 800 further includes a number of compressors (808,810) and heat exchangers (812,814), as well as an optional hydrogen sulphide filter 816. The inlet 802 is connected to a biogas source. For instance, inlet 802 may be connected to anaerobic digester 700 illustrated in FIG. 5 to receive the biogas generated by the digester 700. Outlet 804 may be coupled to a methane storage unit, such as storage system 400 of micro-AD unit 102. For instance, outlet 804 may be connected directly to input valve 802.

Figure 9:
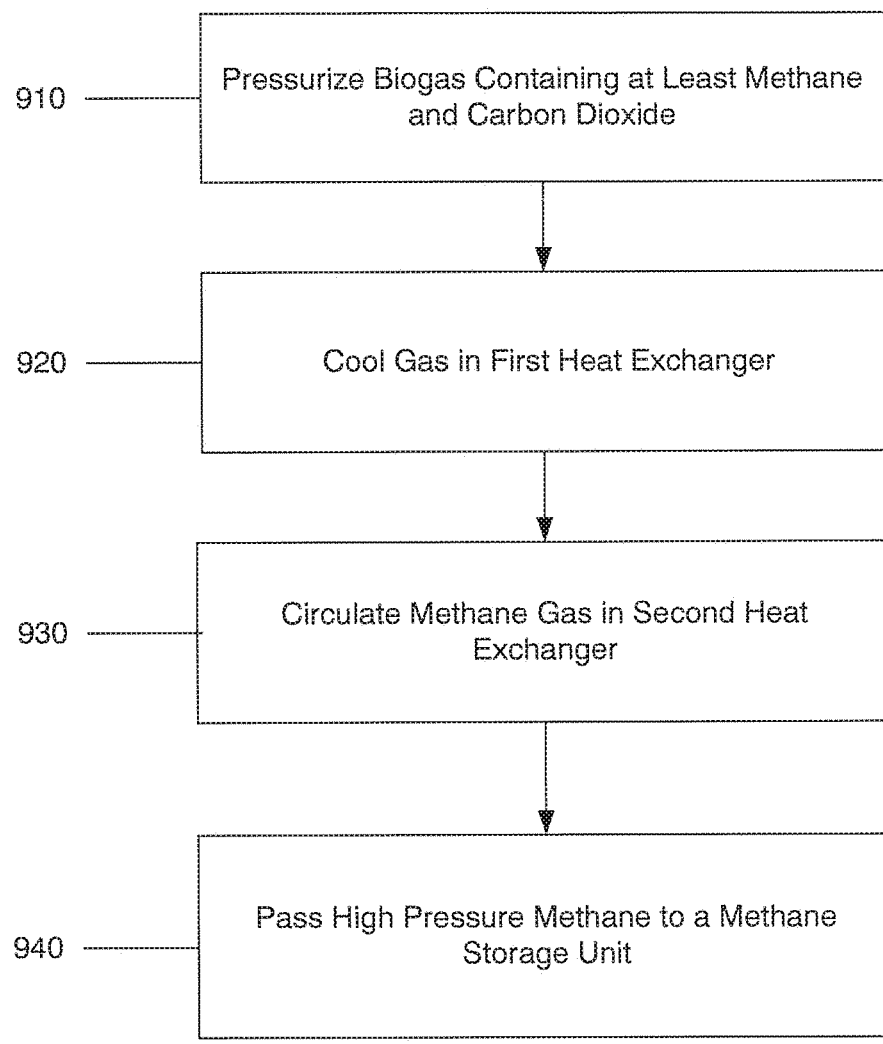
FIG. 9 is a flow chart illustrating a process for removing $CO_2$ from methane-based biogas in accordance with exemplary embodiments.

Referring to FIG. 9, a process 900 for removing $CO_2$ from a methane-based biogas is shown. In step 910, biogas comprised of at least methane and carbon dioxide is pressurized by a compressor. For instance, biogas may be passed through inlet 802 to compressor 808 of FIG. 8 and pressurized by the compressor 808. The biogas may also include hydrogen sulphide, in which case, it may be passed to a filter, such as filter 816 of FIG. 8.

In step 920, the compressed biogas is passed through a heat exchanger, such as heat exchanger 812 of FIG. 8. In some embodiments, the heat exchanger may include a coiled finned tube enclosed by an outer gas shield. At the end of the heat exchanger, the gas passes through small orifice, which results in a rapid expansion of the gas. Due to a phenomenon referred to as the Joule Thomson effect, this rapid expansion results in a rapid cooling of the gas. The compressor, heat exchanger, and orifice can be designed to ensure that the cooling is sufficient to take the output gas below the solidification temperature of carbon dioxide (−78 C). In this instance, the carbon dioxide falls out as a form of $CO_2$ "snow" and can accumulate in a $CO_2$ storage vessel, such as storage unit 806 of FIG. 8. However, the methane, which liquefies at the much lower temperature (−161 C.) remains in a gaseous state and leaves the heat exchanger/storage vessel. For instance, the vessel may include a low pressure output from the heat exchanger to a methane storage system. The carbon dioxide storage vessel can be heavily insulated to allow the carbon dioxide to be stored in its solid form and sized so that the solid $CO_2$ can to be collected. It may be collected, for instance, by a service provider of a micro-AD unit. In some embodiments, a bypass interlock enables the vessel to be back purged to remove any remaining methane before being removal of the solid $CO_2$.

In step 930, the methane gas separated from the carbon dioxide in the sequestration vessel is passed through a second heat exchanger, such as heat exchanger 814 of FIG. 8. This heat exchanger is used to warm the gas prior to it being passed through to a second compressor phase, configured to liquefy the methane. The second heat exchanger effectively recovers some of "cold" that would otherwise be wasted. For instance, in the example of FIG. 8, warm methane may be passed at a low pressure from heat exchanger 814 to compressor 810, and returned at a higher pressure.

In step 940, the methane is passed to a methane storage unit, such as micro-AD 102, for subsequent compression and storage in liquid form. High pressure methane may be passed, for instance, via an outlet such as outlet 804 of FIG. 8.

Figure 10:
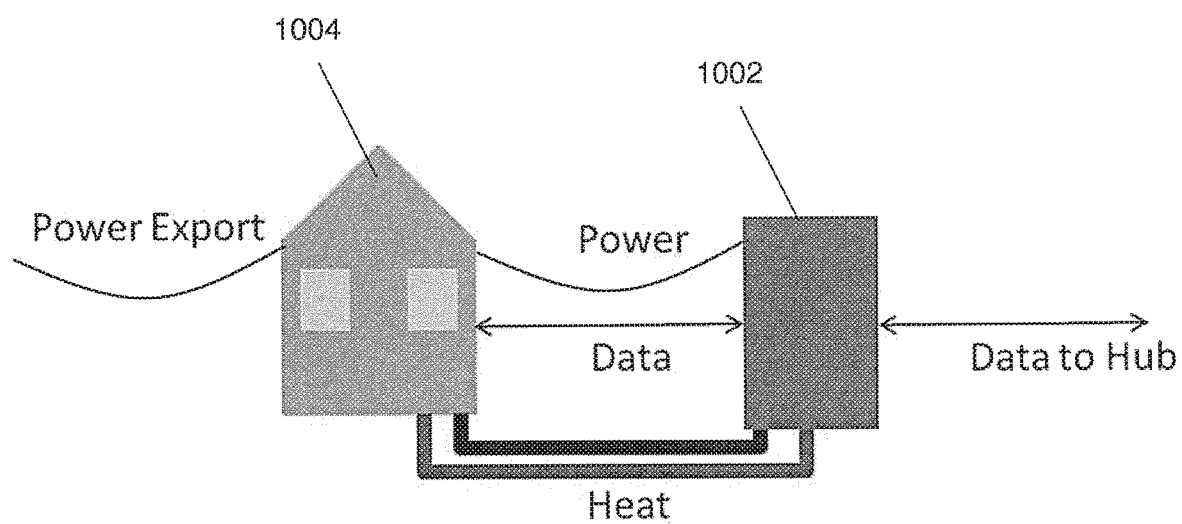
FIG. 10 is a block diagram of an installation configuration in accordance with exemplary embodiments.

Referring now to FIG. 10, a micro-AD installation 1000 is illustrated. In installation 1000, a micro-AD unit 1002, such as micro-AD unit 102, is connected to a structure 1004, such as an office building or home. The micro-AD unit 1002 and structure 1004 are connected via one or more power and data lines, which enable the unit 1002 to monitor physical characteristics of the structure 1004, such as temperature. Depending on the structure 1004's demands, the micro-AD unit 1002 can provide power and/or heat to the structure 1004. In some embodiments, for instance, micro-AD unit 1002 can function as a combined heating and power (CHP) unit, and provide to the structure 1004 heat produced during micro-AD unit 1002's storage operation and generation operation. In certain embodiments, the characteristics of structure 1004 may be monitored by a central controller, such as controller 108. Data transfer to and from the central controller can use the structure 1004's existing internet connection. A secondary back up data transfer can be incorporated via an IP connection made using a mobile telephone network where available.

Figure 11:
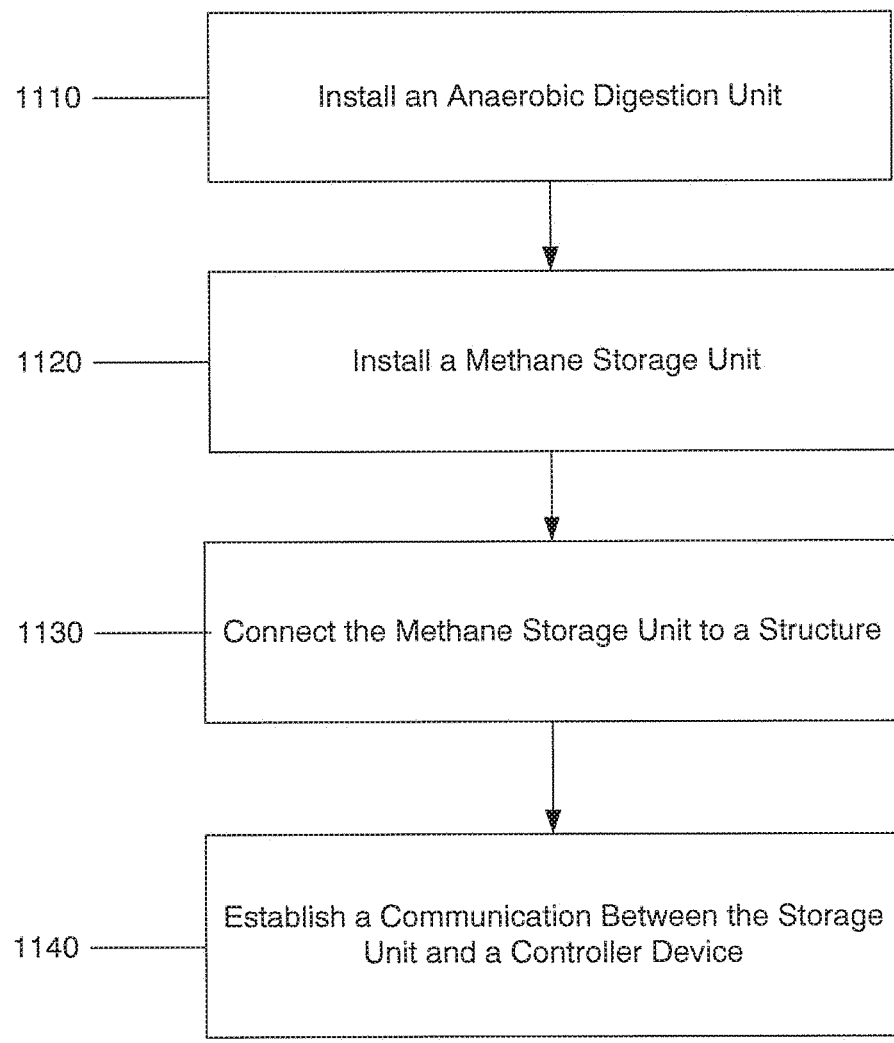
FIG. 11 is a flow chart illustrating a process for anaerobic digestion and methane storage unit installation in accordance with exemplary embodiments.

Referring now to FIG. 11, a process 1100 for installing a micro-AD unit is provided. For instance, process 1100 may be used to install the micro-AD installation 1000 illustrated in FIG. 10.

In step 1110, an anaerobic digester is installed at an installation site, such as a home or business location. The anaerobic digester may be may be, for example, anaerobic digester 700 illustrated in FIG. 7. According to certain embodiments, the anaerobic digester may be specially configured to generate methane gas from green waste feedstock. In some embodiments, the digester may be sized to accommodate a predetermined amount of the green waste generated at the installation site. For instance, the digester may include a sufficient number of tanks such that all of the green waste generated at the installation site during peak growing months can be digested on-site. Alternatively, the digester may be sized based on the power and/or heating needs of one or more structures at the installation site.

In step 1120, a methane storage unit is installed. The methane storage unit may be, for example, the methane storage system 400 illustrated in FIG. 4 and connected to the anaerobic digester of step 1110. The anaerobic digester can provided the methane to the storage unit. According to some embodiments, the storage unit includes one or more power generators configured to be powered by methane gas vented from the storage unit. For instance, the storage unit may include an internal combustion (IC) engine or fuel cell. According to certain aspects, the power generator may be a combined heat and power (CHP) unit, which simultaneously produces electricity and heat that may be captured and re-used. For instance, in the example installation 1000 of FIG. 10, heat may be created during power generation in micro-AD unit 1002 and delivered to structure 1004. In certain embodiments, the heat generated can also be used to accelerate the anaerobic digestion process.

In step 1130, the methane storage unit is connected to a local structure. For instance, in the example installation 1000 of FIG. 10, micro-AD 1002 is connected to a structure 1004. In some embodiments, the structure 1004 may include one or more buildings such as homes and businesses. The connection may include, for example, one or more of power, data, and heat. In the instance of heat, heat created by a CHP co-located with the methane storage unit can be delivered to the structure via an insulated pipe. In some embodiments, the methane storage unit may be located within the structure itself, for instance, in the garage of a home. The methane storage unit may also be located near the home, for instance, within a 100 meter radius. However, it will be recognized by one of ordinary skill in the art that the storage unit may be located remotely from the structure, for example in excess of 1 kilometer, yet service the structure via the one or more connections. For example, a highly insulated pipe may be used to deliver heat to the structure over a large distance.

In step 1140, a communications connection is established between the methane storage unit and a controller device, such as controller 108. The connection may be established, for example, via a network connection over the Internet or wirelessly. In some embodiments, the controller is remotely located.

Figure 12:
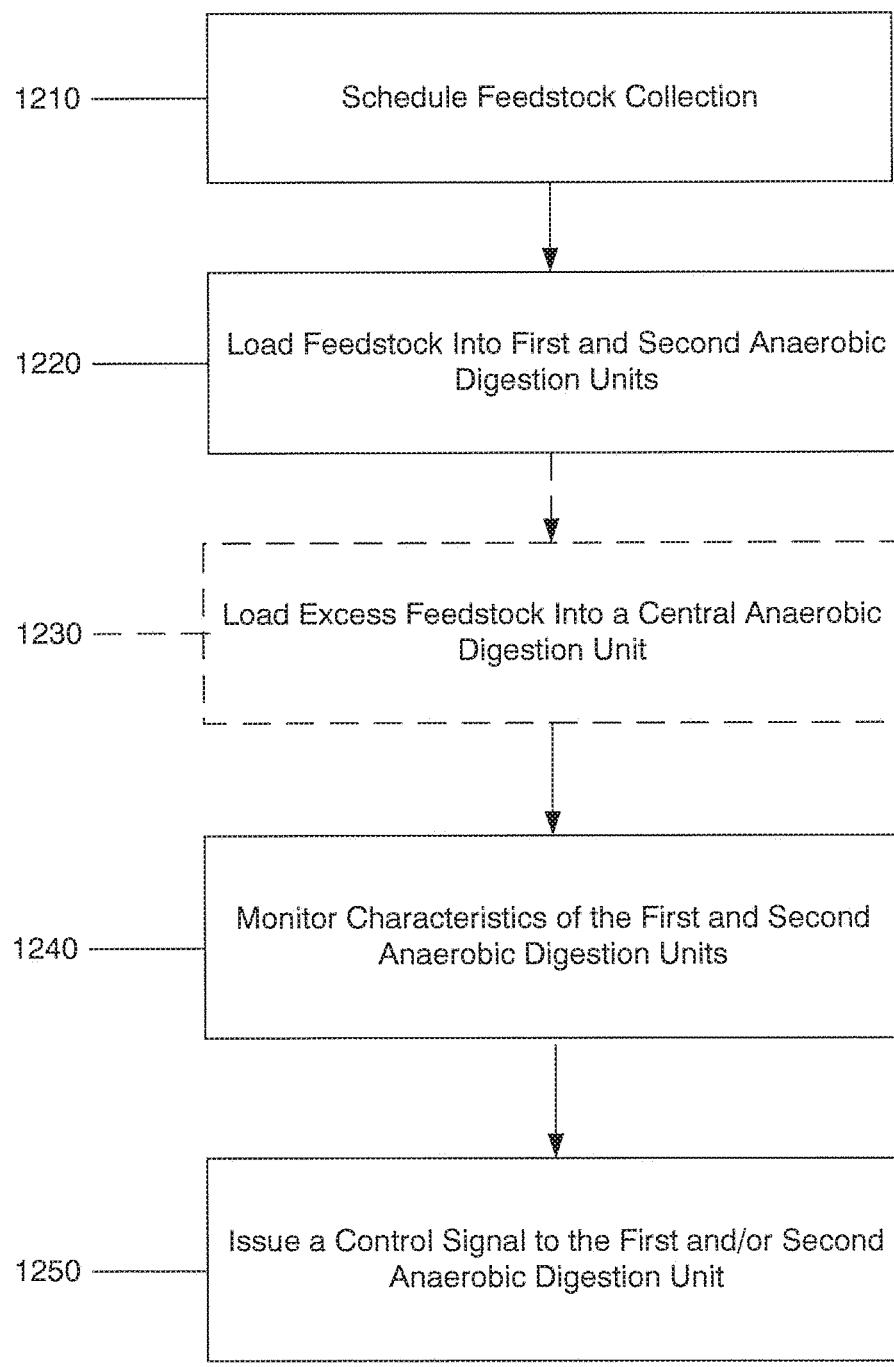
FIG. 12 is a flow chart illustrating a process for managing an anaerobic digestion network in accordance with exemplary embodiments.

Referring now to FIG. 12, a process 1200 for managing an anaerobic digestion network is provided. The anaerobic digestion network can include a plurality of anaerobic digestion units, such as anaerobic digester 700. Additionally, the anaerobic digestion units may be coupled to methane storage units, such as system 400 illustrated in FIG. 4. In some embodiments, the network may be configured as illustrated in FIG. 1 with a plurality of remote micro-AD units 102,104 connected to a central hub 106 and a controller 108.

In step 1210, one or more feedstock collections are scheduled. For instance, feedstock may be scheduled for collection from a first location and a second location. In some embodiments, a first micro-AD unit may be installed at the first location while a second micro-AD unit may be installed at the second unit. However, feedstock can be collected from locations that do not include micro-AD units, such as parks, public green spaces, or neighboring properties. In some embodiments, the collection scheduling is based at least in part on the one or more of the size of the respective micro-AD units or characteristics of their locations.

The process may include collecting the feedstock. In some embodiments, collecting includes performing a mowing service to collect green waste feedstock, such as grass or clover.

In step 1220, feedstock is loaded into first and second anaerobic digesters. In some embodiments, the feedstock is loaded into one or more anaerobic digestion tanks configured to produce methane from green waste feedstock, which are connected to methane storage systems configured to cryogenically store the methane produced by the tanks. For instance, the feedstock can be loaded into anaerobic digester 700 of FIG. 7. According to certain aspects, the first anaerobic digester is located at a first location, while the second anaerobic digester is located at a second, geographically remote, location.

In optional step 1230, excess feedstock is loaded into a central anaerobic digester. For instance, the excess feedstock can be loaded into a central anaerobic digester at central hub 106 in the example network of FIG. 1.

In step 1240, one or more characteristics of the first and second anaerobic digestion units are monitored. For instance, a controller, such as controller 108 of FIG. 1, can be used to monitor one or more of PH, temperature, gas production rate, and gas pressure of the micro anaerobic digestion units. Additionally, the monitored characteristics may relate to energy production and usage. For instance, the characteristics may relate to the amount of electricity produced by an anaerobic digestion unit or used by a structure coupled to the anaerobic digestion.

In step 1250, a control signal is issued to the first and/or second anaerobic digestion units. The control signal may be issued, for instance, by a controller such as controller 108 of FIG. 1. The control signal may be related to adjusting an operational characteristic of the anaerobic digestion tanks or methane storage unit, such as PH, temperature, gas production rate, and gas pressure. For instance, the control signal can operate one or more valves of either an anaerobic digestion tank or storage unit. In certain aspects, the control signal can initiate a safety procedure, such as emergency venting of methane gas due to pressure build-up. In some embodiments, the control signal causes the generation of electrical power, for instance, by causing the storage unit to vent methane gas, which can be used to run a power generator for electricity production.

Figure 13:
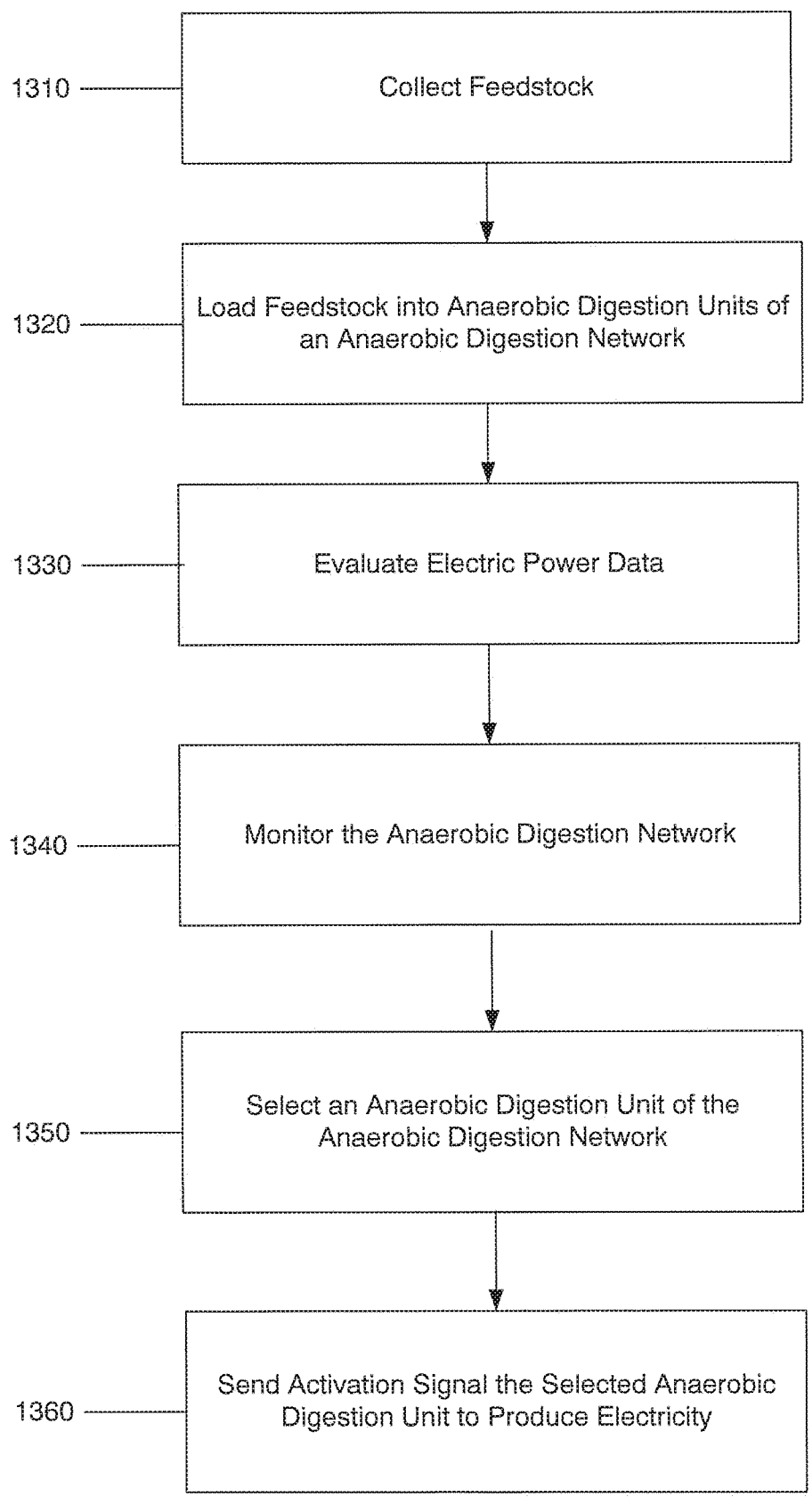
FIG. 13 is a flow chart illustrating a process for managing an anaerobic digestion network in accordance with exemplary embodiments.

It will be apparent to one of ordinary skill in the art that the disclosed systems and processes may be combined. For instance, one or more embodiments may be combined to from a complete anaerobic digestion management, methane gas production, and electricity generation process, which can be centrally controlled. This process can include scheduling and collection of the feedstock, as well as monitoring of electricity data to initiate production at an optimal time. For instance, as illustrated in FIG. 13, an electricity generation process according to an embodiments can include scheduling and performing feedstock collection (step 1310), loading the feedstock into a plurality of anaerobic digestion units (step 1320), which are connected methane storage systems, evaluating electrical power data (step 1330) to determine if electrical power should be produced, monitoring operational characteristics of micro-AD units of an anaerobic digestion network (step 1340), selecting an appropriate micro-AD for production (step 1350), and sending an activation signal to the selected micro-AD to produce electricity (step 1360).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed:

1. A method for controlling a temperature and pressure of liquid or gaseous methane in a cryogenic methane storage unit, comprising:
   venting methane gas from a storage vessel;
   generating electric power by a combustion engine using the vented methane gas;
   initiating a cooling cycle for the storage vessel using the generated electric power; and
   generating the methane gas from a reservoir of liquid methane stored within the methane storage vessel, wherein the generating comprises heating the reservoir of liquid methane, and wherein heating the reservoir of liquid methane comprises activating a heater coupled to the methane storage vessel.

2. The method of claim 1, further comprising:
receiving, at the methane storage unit, an activation signal from a geographically remote controller,
wherein one or more of the venting and generating electric power are in response to the activation signal.

3. The method of claim 1, wherein initiating said cooling cycle include activating a refrigeration unit and coldhead.

4. The method of claim 1, further comprising:
using at least a portion of the generated electrical power to charge a battery.

5. The method of claim 1, further comprising:
providing at least a portion of the generated electrical power to a main electrical grid.

6. The method of claim 1, wherein the cooling cycle reduces the temperature of liquid methane in the storage vessel and reduces the pressure in the storage vessel.

7. A cryogenic liquid methane storage system, comprising:
a methane storage unit comprising a storage vessel and a cooling unit, wherein the storage unit is configured to vent methane gas from the storage vessel through a methane output;
a combustion engine coupled to the methane output, wherein the engine is configured to operate using methane gas vented from the storage unit and provide electrical power to the cooling unit; and
an anaerobic digester coupled to the methane storage unit.

8. The storage system of claim 7, further comprising:
a receiver; and
one or more gas valves that control flow of the vented methane gas to the combustion engine,
wherein the one or more valves are configured to open or close based at least in part on receipt of a power production command.

9. The storage system of claim 7, further comprising:
a resistive heater in thermal contact with the storage vessel of the methane storage unit.

10. The storage system of claim 7, further comprising:
a connection to a main electricity power grid, wherein the system is configured to selectively provide power to the main electricity power grid.

11. The storage system of claim 7, further comprising:
a battery, wherein the combustion engine is configured to charge the battery.

12. A cryogenic liquid methane storage system, comprising:
a methane storage unit comprising a storage vessel and a cooling unit, wherein the storage unit is configured to vent methane gas from the storage vessel through a methane output;
a combustion engine coupled to the methane output, wherein the engine is configured to operate using methane gas vented from the storage unit and provide electrical power to the cooling unit; and
a resistive heater in thermal contact with the storage vessel of the methane storage unit.

13. The storage system of claim 12, further comprising:
a battery, wherein the combustion engine is configured to charge the battery.

14. A cryogenic liquid methane storage system, comprising:
a methane storage unit comprising a storage vessel and a cooling unit, wherein the storage unit is configured to vent methane gas from the storage vessel through a methane output;
a combustion engine coupled to the methane output, wherein the engine is configured to operate using methane gas vented from the storage unit and provide electrical power to the cooling unit;
a receiver; and
one or more gas valves that control flow of the vented methane gas to the combustion engine,
wherein the one or more valves are configured to open or close based at least in part on receipt of a power production command.

15. The storage system of claim 14, further comprising:
a battery, wherein the combustion engine is configured to charge the battery.

16. The storage system of claim 15, further comprising:
an anaerobic digester coupled to the methane storage unit.

* * * * *